No. 745,678. PATENTED DEC. 1, 1903.
L. A. SCHULZE.
MOLDER'S TOOL.
APPLICATION FILED JULY 23, 1902.
NO MODEL.
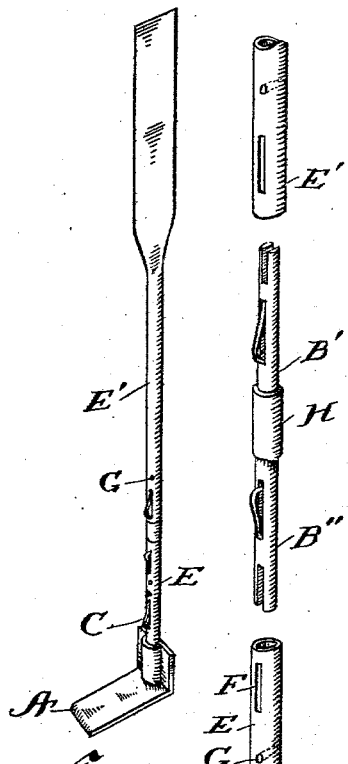
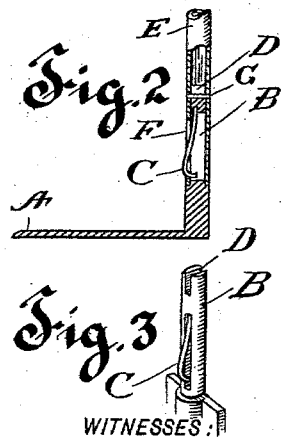
WITNESSES:
Orpha le Poor.
Eliz. Kincaid.
INVENTOR
Louis Albert Schulze
BY
Kincaid & Co.
ATTORNEYS No. 745,678. Patented December 1, 1903.

UNITED STATES PATENT OFFICE.

LOUIS ALBERT SCHULZE, OF SAN FRANCISCO, CALIFORNIA.

MOLDER'S TOOL.

SPECIFICATION forming part of Letters Patent No. 745,678, dated December 1, 1903.

Application filed July 23, 1902. Serial No. 116,692. (No model.)

*To all whom it may concern:*

Be it known that I, LOUIS ALBERT SCHULZE, a citizen of the United States, residing at 783 Mission street, San Francisco, in the county of San Francisco and State of California, have invented certain new and useful Improvements in Molders' Tools for Foundry-Work; and I do hereby declare the following to be a full, clear, and exact description of the invention, such as will enable others skilled in the art to which it appertains to make and use the same.

My present invention is an improved molder's tool for foundry-work; and it has for its objects to provide a tool capable of being readily attached to or detached from its handle, thereby affording the substitution of various lengths and forms of handles without the necessity and expense of making a number of the same shape of tool having various handles. The tools can be positioned at both ends of the handles, thereby making it possible to combine a "button" and "bead" or a "circular flange" and "flat flange," &c., on opposite ends of the same handle. The methods shown of holding the tool proper to the handle are aimed to prevent accidental turning or other displacement, and, further, I have aimed at structural simplicity and economy.

I am enabled to accomplish the above results by the means illustrated in the accompanying drawings, in which—

Figure 1 is a perspective view of a "lifter-slick" with my extensible handle positioned thereon. Fig. 2 is a central section of the same. Fig. 3 shows the "lifter" with the handle removed. Fig. 4 is a perspective view of the several joints of this handle detached.

I will now explain the construction of my invention, reference being had to the above views by letter.

In Fig. 1 the tool proper, A, is a lifter and is formed with the short shank or stem B. This stem is formed with a spring C and notched or forked end D, while the pipe or handle E is formed with a slot F and cross-pin G, which receive this spring and forked end, as shown in Figs. 1 and 2. From Figs. 1, 2, 3, and 4 it is manifest that the tool A can be readily attached to or detached from the handle by simply forcing the male and female parts together. Now should it be desirable to increase the length of the handle I have provided the coupling H, which has opposite stems B' and B", which are formed similar to stem B and to which an additional length of handle E' can be attached, as shown in Fig. 1. The connection between the parts is made by simply forcing the coupling into the handles E and E'.

I am aware that various other modifications of the elements shown can be resorted to to form a connection between the handle and tool, so in such mechanical substitutions I wish to be protected.

By the use of my invention various lengths of handles can be quickly attached to any shape or size of tool, thereby doing away with the necessity of a large quantity of expensive and bulky material that would otherwise be used in providing a handle for each tool, as is the case where they are formed integral.

When it is considered that hundreds of forms and sizes of tool constitute a founder's kit, it will be seen what an advantage this simple adjustable and extensible handle is.

Having thus fully described my invention, what I claim, and desire to secure by Letters Patent, is—

A molder's tool provided with a projecting stem, a handle adapted to engage said stem, and a spring on said stem adapted to engage and project through a slot in said handle and prevent accidental displacement of said tool relative to said handle and a transverse pin in said handle adapted to engage said stem and prevent independent twisting thereof for the purpose set forth.

In testimony whereof I affix my signature in presence of two witnesses.

LOUIS ALBERT SCHULZE.

Witnesses:
 GEORGE PATTISON,
 ELIZ. KINCAID.